US012785238B2

(12) United States Patent
Fu et al.

(10) Patent No.: US 12,785,238 B2
(45) Date of Patent: Nov. 3, 2026

(54) COMMUNICATION DEVICE

(71) Applicant: Telefonaktiebolaget LM Ericsson (publ), Stockholm (SE)

(72) Inventors: Jun Fu, Beijing (CN); Weidong Wang, Beijing (CN); Xueyuan Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 152 days.

(21) Appl. No.: 18/835,758

(22) PCT Filed: Feb. 25, 2022

(86) PCT No.: PCT/CN2022/077970
§ 371 (c)(1),
(2) Date: Aug. 5, 2024

(87) PCT Pub. No.: WO2023/159482
PCT Pub. Date: Aug. 31, 2023

(65) Prior Publication Data
US 2025/0132480 A1 Apr. 24, 2025

(51) Int. Cl.
*H01P 1/213* (2006.01)
*H01P 1/208* (2006.01)
*H01P 7/06* (2006.01)

(52) U.S. Cl.
CPC ............ *H01P 1/208* (2013.01); *H01P 1/2136* (2013.01); *H01P 7/06* (2013.01)

(58) Field of Classification Search
CPC .. H01P 1/208; H01P 1/20; H01P 1/213; H01P 1/2133; H01P 1/2135; H01P 1/2136; H01P 1/2138
USPC .......................................................... 333/137
See application file for complete search history.

(56) References Cited

U.S. PATENT DOCUMENTS

2013/0009728 A1 1/2013 Puoskari et al.
2015/0130562 A1 5/2015 Seo et al.
2017/0084977 A1 3/2017 Niiranen
(Continued)

FOREIGN PATENT DOCUMENTS

CN 1434539 A 8/2003
CN 103490128 A 1/2014
CN 103972615 A 8/2014
(Continued)

OTHER PUBLICATIONS

Extended European Search Report for European Patent Application No. 22927768.6, mailed Jul. 9, 2025, 7 pages.
(Continued)

*Primary Examiner* — Stephen E. Jones
(74) *Attorney, Agent, or Firm* — Withrow & Terranova, PLLC

(57) ABSTRACT

The present disclosure relates to a communication device such as a multiplexer or a demultiplexer, comprising: a housing comprising a common first port and a plurality of second ports; a plurality of cavity filters for transmitting a wireless signal between the first port and a corresponding one of the second ports, each of the plurality of cavity filters comprising one or more cavities formed in the housing and a resonator arranged in each cavity; and a coupler for coupling the first port to each cavity filter. The coupler is arranged in one cavity of each cavity filter, and is coupled to the resonator in the one cavity.

14 Claims, 4 Drawing Sheets

(56) References Cited

U.S. PATENT DOCUMENTS

2017/0237137 A1 8/2017 Yoshida

FOREIGN PATENT DOCUMENTS

| | | | |
|---|---|---|---|
| CN | 104466315 | A | 3/2015 |
| CN | 111211391 | A | 5/2020 |
| CN | 112952325 | A | 6/2021 |
| EP | 0817301 | B1 | 9/2002 |

OTHER PUBLICATIONS

International Search Report and Written Opinion for International Patent Application No. PCT/CN2022/077970, mailed Nov. 16, 2022, 10 pages.

COMMUNICATION DEVICE

This application is a 35 U.S.C. § 371 national phase filing of International Application No. PCT/CN2022/077970, filed Feb. 25, 2022, the disclosure of which is incorporated herein by reference in its entirety.

TECHNICAL FIELD

The present disclosure generally relates to the technical field of communication device, and more particularly, to a multiplexer or a demultiplexer.

BACKGROUND

This section introduces aspects that may facilitate better understanding of the present disclosure. Accordingly, the statements of this section are to be read in this light and are not to be understood as admissions about what is in the prior art or what is not in the prior art.

Base station (BS) is an important part of a mobile communication system. In traditional BS solution, a metal cavity filter unit (FU) is mostly recommended because of its high Q (quality) value and power handling performance. For 5G advanced radio system, more challenges are arising in terms of the size and weight of FU. Small size filter is one of the preferred 4G/5G FU solutions, due to high performance, light weight, small size and easy integration.

Currently, traditional small volume filter can only be used as a single filter, and there are some technical problems for the combination of multiple filters. For multiplexers without directional or isolating elements (Circulator or hybrid), the edge loss and group delay vary greatly due to the reflection of adjacent channels, which affects the performance of multiplexer, mainly including insertion loss and return loss. For multiplexers with directional or isolating elements (Isolator or hybrid), performance is reduced because of additional insertion losses. Neither of the two kinds of multiplexers has inhibition to high frequency band.

Moreover, the band width of the current multiplexers or multi band filters is limited, while the wideband Radio demands for wide band filters.

In addition, current common port coupling structure has poor performance on high frequency.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide a wideband coupling structure for small size filters.

According to a first aspect of the disclosure, there is provided a communication device, comprising: a housing comprising a common first port and a plurality of second ports; a plurality of cavity filters for transmitting a wireless signal between the first port and a corresponding one of the second ports, each of the plurality of cavity filters comprising one or more cavities formed in the housing and a resonator arranged in each cavity; and a coupler for coupling the first port to each cavity filter. The coupler is arranged in one cavity of each cavity filter, and is coupled to the resonator in the one cavity.

In an embodiment of the disclosure, the coupler comprises at least one low resistance portion and at least one high resistance portion, and forms a low pass filter.

In an embodiment of the disclosure, the high resistance portion runs through a separator between two adjacent cavity filters.

In an embodiment of the disclosure, the low resistance portion is arranged in the one cavity of at least one cavity filter.

In an embodiment of the disclosure, the coupler comprises a conductive bar inserted into the one cavity of each cavity filter, an end of which is connected to the first port.

In an embodiment of the disclosure, the low resistance portion extends outwardly from the conductive bar to have a greater diameter or cross section than that of the high resistance portion, and is coupled to the resonator in the one cavity of at least one cavity filter.

In an embodiment of the disclosure, the resonator of the at least one cavity filter comprises a hole, and the low resistance portion is fitted in the hole.

In an embodiment of the disclosure, a dielectric ring is provided between the low resistance portion and the hole.

In an embodiment of the disclosure, a coupling bandwidth between the respective cavity filters and the coupler can be adjusted by adjusting the diameter/width or cross section area of the conductive bar at the coupling position of the corresponding resonator and/or the diameter of the hole.

In an embodiment of the disclosure, the coupler comprises a metal sheet attached to an inner wall of the housing and connected to the first port.

In an embodiment of the disclosure, the metal sheet is substantially in a shape of a comb with wide teeth, and the wide teeth of the comb forming the low resistance portions are positioned adjacent to the resonator in the one cavity of the respective cavity filters.

In an embodiment of the disclosure, the wide teeth of the comb are covered with plastic material.

In an embodiment of the disclosure, a coupling bandwidth between the respective cavity filters and the coupler can be adjusted by adjusting the surface area of the metal sheet at the coupling position of the corresponding resonator.

In an embodiment of the disclosure, the plurality of cavity filters are sheet metal filters.

In an embodiment of the disclosure, the communication device is a multiplexer, and the first port is an output port via which filtered wireless signal is output from the communication device.

In an embodiment of the disclosure, the communication device is a demultiplexer, and the first port is an input port via which the wireless signal is input into the communication device.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

Figure 1:
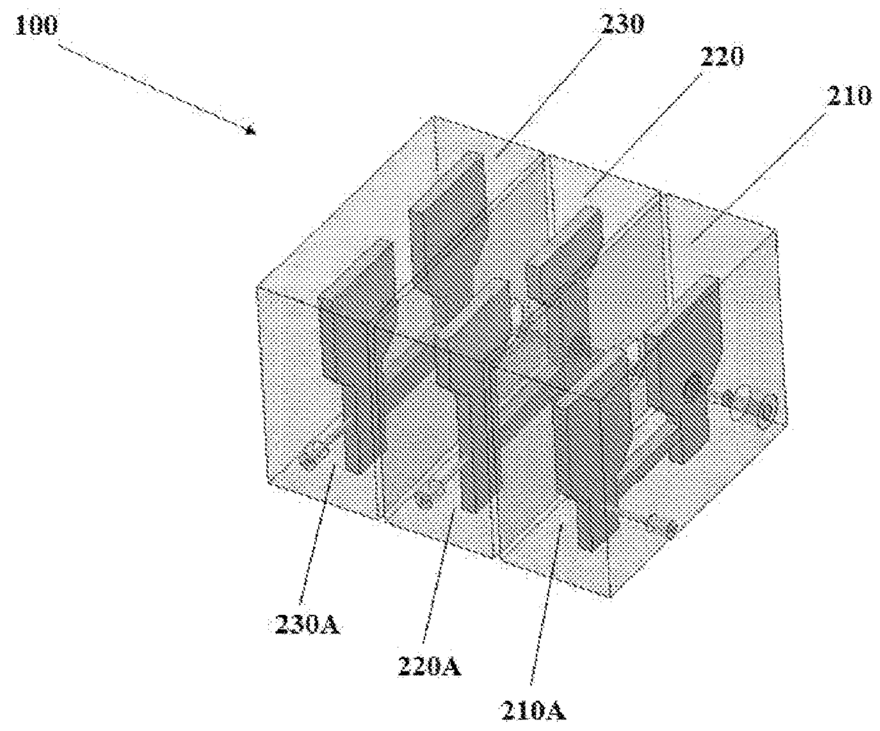
FIG. 1 shows a schematic view of a demultiplexer according to a first embodiment of the present disclosure.

The embodiments of the present disclosure are described in detail with reference to the accompanying drawings. It should be understood that these embodiments are discussed only for the purpose of enabling those skilled in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. Those skilled in the relevant art will recognize that the disclosure may be practiced without one or more of the specific features or advantages of a particular embodiment. In other instances, additional features and advantages may be recognized in certain embodiments that may not be present in all embodiments of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In the evolution of technology, a multi-pass band filter such as a multiplexer or a demultiplexer is used in 5G communication system. A demultiplexer is mainly used to divide a broadband signal into multiple signals. In the multi-user environment, the channelization of frequency band allocation according to traffic volume has great flexibility. In addition, a multiplexer is mainly used to combine multiple signals into a mixed signal and transmit it through the common antenna. Due to the reciprocity of filter network, a multi-pass band filter can also play the role of separating transmitting and receiving frequency bands in the same device.

5G single-band filter has advantages of large bandwidth, low loss and high frequency harmonic performance. Large bandwidth means small group delay, which is a great challenge to integrate multiple large bandwidths into a multiplexer. At the same time, in order to suppress high frequency harmonics, additional volume has to be added to integrate the low pass filter into the band pass filter. Accordingly, a new coupling structure is needed.

Figure 2:
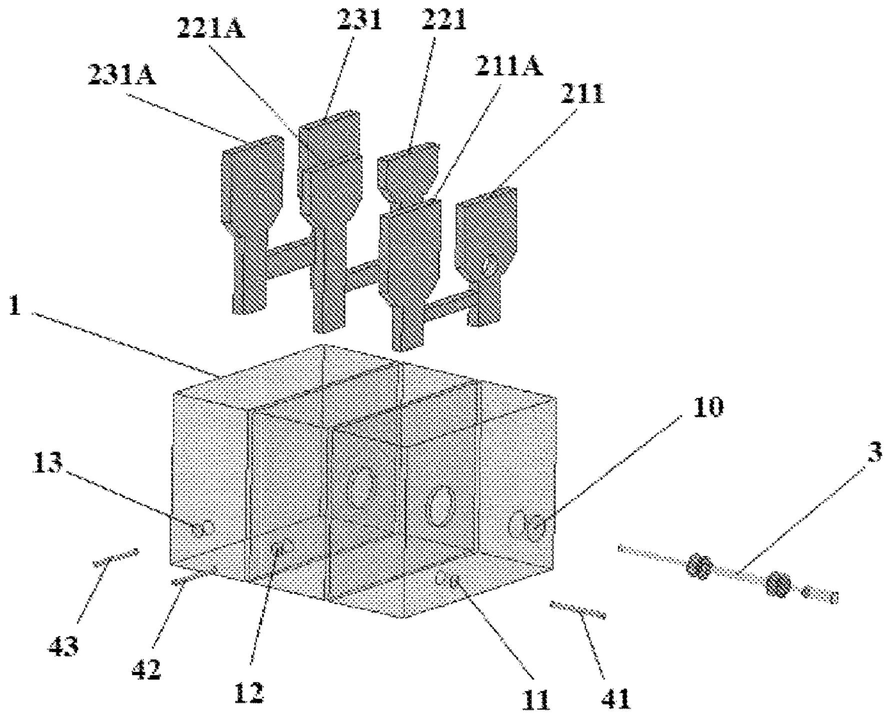
FIG. 2 shows an exploded view of the demultiplexer according to the first embodiment of the present disclosure.
Figure 3:
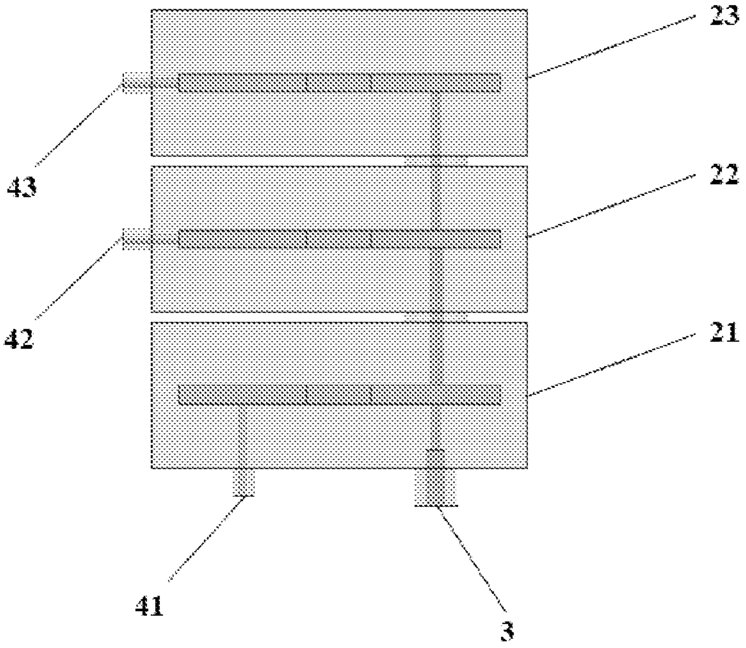
FIG. 3 shows a top view of the demultiplexer according to the first embodiment of the present disclosure.

FIG. 1 shows a schematic view of a demultiplexer according to a first embodiment of the present disclosure. FIG. 2 shows an exploded view of the demultiplexer according to the first embodiment. FIG. 3 shows a top view of the demultiplexer according to the first embodiment.

As shown in FIGS. 1-3, the demultiplexer 100 according to the first embodiment comprises a housing 1 and a plurality of cavity filters 21, 22, 23 in the housing 1.

The housing 1 as shown is in the shape of a box, but it can be changed to any shape as needed. The housing 1 may be made of metal (for example, aluminum), or be made of non-metal base with a metallized surface. The housing 1 comprises a common input port 10 and a plurality of output ports 11, 12, 13. In the illustrated embodiment, there are three cavity filters and three output ports. Those skilled in the art will recognize that the number of the cavity filters corresponds to the number of the output ports, and the number may be two, four, five or more.

The input port 10 may be connected with an antenna (not shown). Each of the plurality of output ports 11, 12, 13 may be connected with a signal processing circuit (not shown). As shown in FIG. 1 and FIG. 2, the input port 10 and a first output port 11 are positioned at a first surface (the right surface in FIG. 2) of the housing 1, and a second output port 12 and a third output port 13 are positioned at a second surface (the front surface in FIG. 2) of the housing 1 that is adjacent to the first surface. Those skilled in the art will recognize that the first output port 11 may also be positioned at the second surface of the housing 1, or any of the output ports 11, 12, 13 may be positioned at a third surface (for example, the lower surface in FIG. 2) of the housing 1.

Each of the plurality of cavity filters 21, 22, 23 comprises one or more cavities, and a resonator is arranged in each cavity. In the illustrated embodiment, each of the cavity filters 21, 22, 23 is a sheet metal filter, and comprises two resonators, i.e., a first resonator 211, 221, 231 and a second resonator 211A, 221A, 231A, which are respectively arranged in a first cavity 210, 220, 230 and a second cavity 210A, 220A, 230A and are connected to each other. The present disclosure is not limited to sheet metal filters, and other kinds of cavity filters, for example, coaxial cavity filters with cylindrical resonators, are also possible. In certain embodiments, a partition wall with a window or a groove may be formed between adjacent cavities of the same cavity filter. Each of the plurality of cavity filters 21, 22, 23 may be a band-pass filter for transmitting a wireless signal between the input port 10 and a corresponding one of the output ports 11, 12, 13.

The demultiplexer 100 according to the first embodiment further comprises a coupler 3 for coupling the input port 10 to the first resonator 211, 221, 231 of each of the cavity filters 21, 22, 23. Details of the coupler 3 will be described later. The demultiplexer 100 according to the first embodiment further comprises a plurality of connecting rods 41, 42, 43 for connecting the second resonator 211A, 221A, 231A of the respective cavity filters 21, 22, 23 to a corresponding one of the output ports 11, 12, 13.

Figure 4:
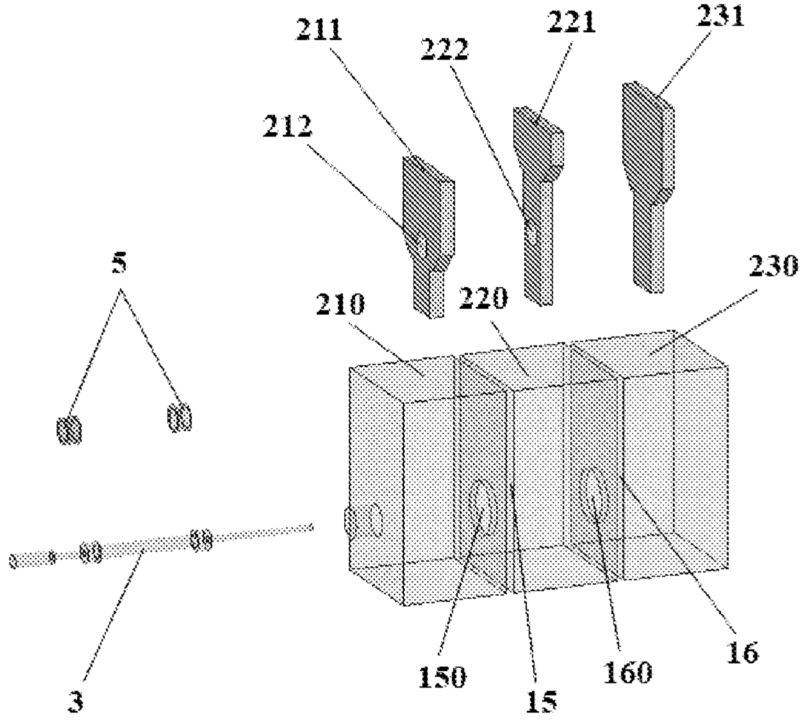
FIG. 4 shows an exploded view of a part of the demultiplexer according to the first embodiment of the present disclosure.

FIG. 4 shows an exploded view of a part of the demultiplexer 100 according to the first embodiment, illustrating the coupling structure between the coupler 3 and the first resonators 211, 221, 231 of the cavity filters 21, 22, 23. FIG.

5 shows a schematic view of a lowpass filter structure formed by the coupler 3 of the demultiplexer 100.

In the first embodiment, the coupler 3 is formed as a conductive bar 3. The conductive bar 3 is inserted into the first cavity 210, 220, 230 of each of the cavity filters 21, 22, 23, and is coupled to the first resonator 211, 221, 231 in the first cavity 210, 220, 230 of each cavity filter 21, 22, 23. A first end of the conductive bar 3 is connected to the input port 10.

Figure 5:
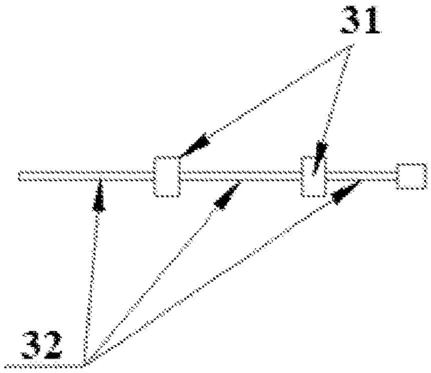
FIG. 5 shows a schematic view of a lowpass filter structure formed by a coupler of the demultiplexer according to the first embodiment of the present disclosure.

As best shown in FIG. 5, the conductive bar 3 comprises a body portion having a first diameter and three bulging portions extending outwardly from the body portion to have a second diameter greater than the first diameter. It should be noted that the diameter of one bulging portion may differ from the diameter of another bulging portion. The bulging portion at the first end of the conductive bar 3 is fitted into the input port 10. The other two bulging portions shown in FIG. 5 are respectively arranged in the first cavity 210, 220 of two cavity filters 21, 22, and each form a low resistance portion 31. The body portion of the conductive bar 3 forms three high resistance portions 32 that are spaced from each other by the two low resistance portions 31. Thus, after being placed in the housing 1, the conductive bar 3 forms a low pass filter.

As shown in FIG. 4, each of the first resonators 211, 221 of the two cavity filters 21, 22 comprises a hole 212, 222. A first low resistance portion 31 is fitted in the hole 212 and is coupled to the first resonator 211 of the cavity filter 21. A second low resistance portion 31 is fitted in the hole 222 and is coupled to the first resonator 221 of the cavity filter 22. Thus, a capacitance coupling is formed between the low resistance portion 31 and the first resonator 211 or 221. In the illustrated embodiment, a dielectric ring 5 is provided between the low resistance portion 31 and the hole 212 or 222 to enhance the capacitance effect. In other embodiments, the dielectric ring 5 may be dispensed with.

As shown in FIG. 4, a hole 150 is formed in a separator 15 between the first cavity 210 of the cavity filter 21 and the first cavity 220 of the cavity filter 22, and a hole 160 is formed in a separator 16 between the first cavity 220 of the cavity filter 22 and the first cavity 230 of the cavity filter 23. A first high resistance portion 32 runs through the hole 150 of the separator 15, forming an inductance effect which helps to isolate the two adjacent cavity filters 21 and 22. A second high resistance portion 32 runs through the hole 160 of the separator 16, forming an inductance effect which helps to isolate the two adjacent cavity filters 22 and 23. The diameter of the hole 15, 16 is substantially larger than the diameter of the first or second high resistance portion 32 (i.e., the first diameter of the body portion of the conductive bar 3).

In the illustrated embodiment, unlike the first resonators 211, 221 of the two cavity filters 21, 22, the first resonator 231 of the cavity filter 23 does not have a hole. A second end of the conductive bar 3 is abutted against the first resonator 231 of the cavity filter 23. Thus, an inductance coupling is formed between the second end of the conductive bar 3 and the first resonator 231 of the cavity filter 23. In other embodiments, the first resonator 231 of the cavity filter 23 may also have a hole through which the second end of the conductive bar 3 passes, and a capacitance coupling is formed between the second end of the conductive bar 3 and the first resonator 231 of the cavity filter 23. In that case, the second end of the conductive bar 3 may have a larger diameter than the first diameter of the body portion of the conductive bar 3, and a dielectric ring 5 may be optionally provided between the second end of the conductive bar 3 and the hole in the first resonator 231 of the cavity filter 23.

In the first embodiment, a first channel is formed by the input port 10, the coupler 3, the cavity filter 21, the connecting rod 41 and the first output port 11, a second channel is formed by the input port 10, the coupler 3, the cavity filter 22, the connecting rod 42 and the second output port 12, and a third channel is formed by the input port 10, the coupler 3, the cavity filter 31, the connecting rod 43 and the third output port 13. The coupler 3 may transmit a wireless signal input through the input port 10 to the cavity filters 21, 22, 23. Each of the cavity filters 21, 22, 23 filters the wireless signal and only passing a predetermined specific frequency band. The filtered wireless signal is output through the respective output ports 11, 12, 13 to a corresponding signal processing unit.

The maximum bandwidth that a filter can achieve is determined by the input coupling bandwidth. In the first embodiment, a coupling bandwidth between the respective cavity filters 21, 22, 23 and the coupler 3, i.e., the input coupling bandwidth, can be adjusted by adjusting the diameter/width or cross section area of the conductive bar 3 at the coupling position of the corresponding first resonator 211, 221, 231, and/or the diameter of the hole 212, 222 of the first resonator 211, 221.

Figure 6:
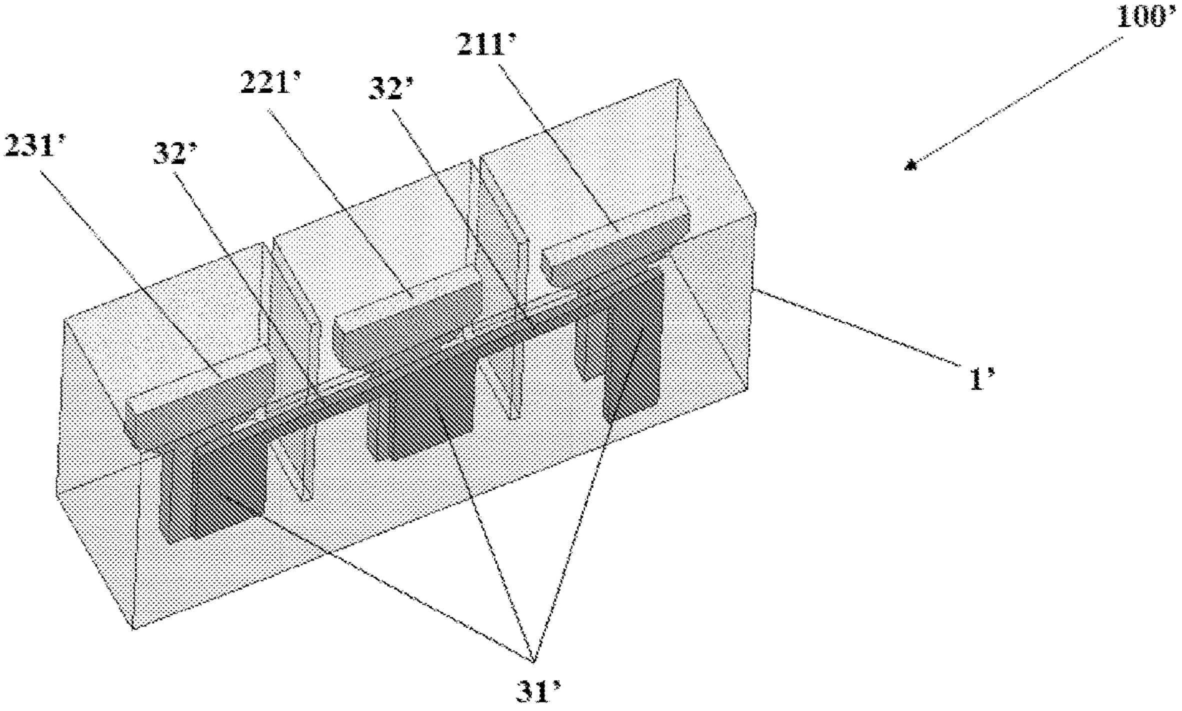
FIG. 6 shows a schematic view of a part of a demultiplexer according to a second embodiment of the present disclosure.
Figure 7:
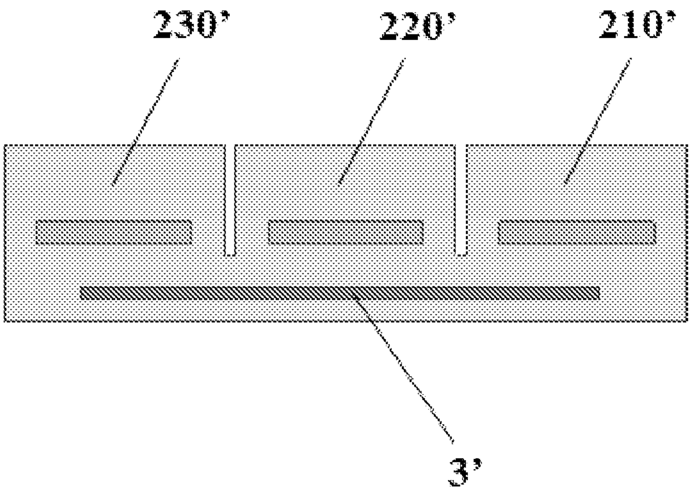
FIG. 7 shows a top view of the part of the demultiplexer according to the second embodiment of the present disclosure.
Figure 8:
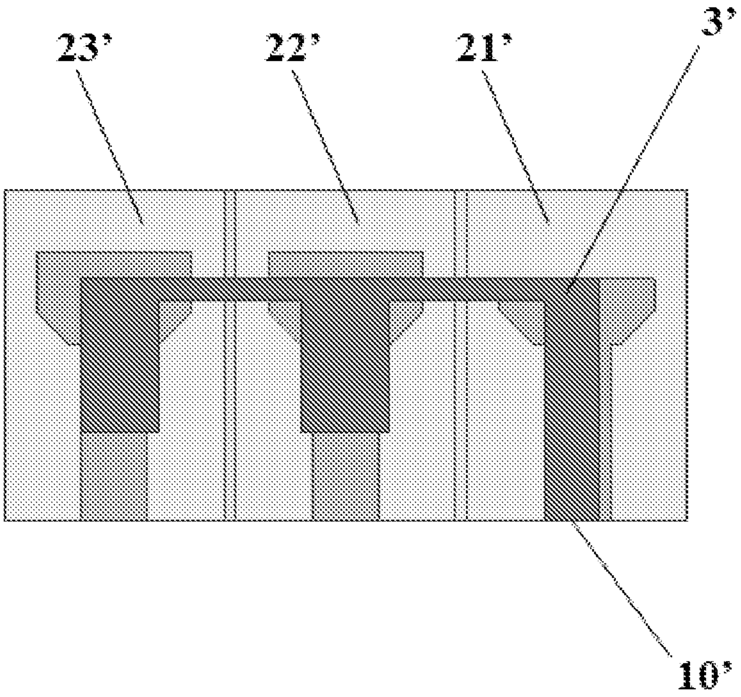
FIG. 8 shows a side view of the part of the demultiplexer according to the second embodiment of the present disclosure.

Next, a demultiplexer according to a second embodiment of the present disclosure will be described. FIG. 6 shows a schematic view of a part of the demultiplexer, FIG. 7 shows a top view of the part of the demultiplexer, and FIG. 8 shows a side view of the part of the demultiplexer. In the following description of the second embodiment, redundant explanations of parts which are identical or similar to those in the first embodiment will be omitted or simplified.

As shown in FIGS. 6-8, the demultiplexer 100' according to the second embodiment comprises a housing 1' and a plurality of (for example, three) cavity filters 21', 22', 23' in the housing 1. The housing 1 comprises a common input port 10' and a plurality of output ports (not shown). Each of the plurality of cavity filters 21', 22', 23' comprises one or more cavities 210', 220', 230', and a resonator 211', 221', 231' is arranged in each cavity. The demultiplexer 100' further comprises a coupler 3' for coupling the input port 10' to the resonator 211', 221', 231' of each of the cavity filters 21', 22', 23'.

In the second embodiment, the coupler 3' is formed as a metal sheet 3'. The resonators 211', 221', 231' extend in substantially the same plane, and the metal sheet 3' extends in parallel with the resonators 211', 221', 231 and is attached to an inner wall of the housing 1'. The metal sheet 3' is substantially in a shape of a comb with wide teeth. Each of the wide teeth 31' of the comb is positioned adjacent to a corresponding resonator 211', 221', 231' in the corresponding cavity 210', 220', 230' of the respective cavity filter 21', 22', 23', and forms a low resistance portion. The portions between the wide teeth 31' of the metal sheet 3' form two high resistance portions 32'. Thus, after being placed in the housing 1', the metal sheet 3' forms a low pass filter. Optionally, the wide teeth 31' of the comb may be covered with plastic material.

As can be seen from FIG. 6 and FIG. 8, the wide tooth 31' arranged in the cavity 210' of the cavity filter 21' is longer than the wide teeth 31', 31' arranged in the cavities 220', 230' of the cavity filter 22', 23', and is connected to the input port 10' which is positioned at the lower surface of the housing 1'. Those skilled in the art will recognize that the input port 10' may be positioned at the right surface of the housing 1', and in that case, the metal sheet 3' is connected at its right end to the input port 10', and the wide tooth 31' arranged in the cavity 210' of the cavity filter 21' does not extend to the bottom of the housing 1'.

In the illustrated second embodiment, a capacitance coupling is formed between each of the low resistance portions (wide teeth) 31' of the coupler 3' and a corresponding one of the resonators 211', 221', 231' of the cavity filters 21', 22', 23'. A coupling bandwidth between one of the cavity filters 21', 22', 23' and the coupler 3' can be adjusted by adjusting the surface area of the metal sheet 3' at the coupling position of the corresponding resonator 211', 221', 231', that is, the surface area of the corresponding wide tooth 31'.

While the above first and second embodiments have been described with reference to the demultiplexer 100 or 100', it will be understood by those skilled in the art that the present disclosure is not limited to the demultiplexer, and is applicable to other kinds of communication device. For example, the communication device according to embodiments of the present disclosure may be a multiplexer having similar configuration as shown in FIGS. 1-8, in which multiple signals input via a plurality of ports (for example, ports 11, 12, 13) are filtered and combined into a mixed signal, and the mixed signal is output via a single common port (for example, port 10, 10').

Advantages of embodiments of the present disclosure will be described below.

According to the present disclosure, a coupler is provided for coupling a common port to each of a plurality of cavity filters relating to different channels, and the coupler is arranged in one cavity of each cavity filter and is coupled to the resonator in the one cavity. The coupling structure can simultaneously support two or more channels, and the relative bandwidth of each channel is more than 7%.

Moreover, the coupling structure can be freely arranged to form a low pass filter, so as to provide effective suppression for filters requiring high frequency suppression. And it has the function of frequency selection and suppression high frequency passband.

Furthermore, the coupling structure can merge any number of channels regardless of their bandwidth and channel spacing, and can be used in any topology if needed. It is applicable to both a band-pass multiplexer/demultiplexer or a band-stop multiplexer/demultiplexer.

The loss of the coupling structure is small and almost negligible as compared with conventional directional devices.

The coupling structure can be made very light and compact from mechanical view. It is efficient to produce, benefit both production consistency and accuracy.

The multiplex or demultiplexer according to the present disclosure is more flexible in design with macro station, which also has advantage in production and cost.

References in the present disclosure to “an embodiment”, “another embodiment” and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, the term “and/or” includes any and all combinations of one or more of the associated listed terms.

The terminology used herein is for the purpose of describing particular embodiments only and is not intended to limit the present disclosure. As used herein, the singular forms “a”, “an” and “the” are intended to include the plural forms as well, unless the context clearly indicates otherwise. It will be further understood that the terms “comprises”, “comprising”, “has”, “having”, “includes” and/or “including”, when used herein, specify the presence of stated features, elements, and/or components, but do not preclude the presence or addition of one or more other features, elements, components and/or combinations thereof. The terms “connect”, “connects”, “connecting” and/or “connected” used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A communication device, comprising:

a housing comprising a common first port and a plurality of second ports;

a plurality of cavity filters for transmitting a wireless signal between the first port and a corresponding one of the second ports, each of the plurality of cavity filters comprising one or more cavities formed in the housing and a resonator arranged in each cavity; and a coupler for coupling the first port to each cavity filter, wherein the coupler comprises at least one low resistance portion and at least one high resistance portion, and forms a low pass filter, wherein the low resistance portion is arranged in the one cavity of at least one cavity filter, and wherein the coupler is arranged in one cavity of each cavity filter and is coupled to the resonator in the one cavity.

2. The communication device according to claim 1, wherein the high resistance portion runs through a separator between two adjacent cavity filters.

3. The communication device according to claim 1, wherein the coupler comprises a conductive bar inserted into the one cavity of each cavity filter, an end of which is connected to the first port.

4. The communication device according to claim 3, wherein the low resistance portion extends outwardly from the conductive bar to have a greater diameter or cross section than that of the high resistance portion, and is coupled to the resonator in the one cavity of at least one cavity filter.

5. The communication device according to claim 4, wherein the resonator of the at least one cavity filter comprises a hole, and the low resistance portion is fitted in the hole.

6. The communication device according to claim 5, wherein a dielectric ring is provided between the low resistance portion and the hole.

7. The communication device according to claim 5, wherein a coupling bandwidth between the respective cavity filters and the coupler can be adjusted by adjusting the diameter/width or cross section area of the conductive bar at the coupling position of the corresponding resonator and/or the diameter of the hole.

8. The communication device according to claim 1, wherein the coupler comprises a metal sheet attached to an inner wall of the housing and connected to the first port.

9. The communication device according to claim 8, wherein the metal sheet is substantially in a shape of a comb with wide teeth, and the wide teeth of the comb forming the low resistance portions are positioned adjacent to the resonator in the one cavity of the respective cavity filters.

10. The communication device according to claim 9, wherein the wide teeth of the comb are covered with plastic material.

11. The communication device according to claim 8, wherein a coupling bandwidth between the respective cavity filters and the coupler can be adjusted by adjusting the surface area of the metal sheet at the coupling position of the corresponding resonator.

12. The communication device according to claim 1, wherein the plurality of cavity filters are sheet metal filters.

13. The communication device according to claim 1, wherein the communication device is a multiplexer, and the first port is an output port via which filtered wireless signal is output from the communication device.

14. The communication device according to claim 1, wherein the communication device is a demultiplexer, and the first port is an input port via which the wireless signal is input into the communication device.

* * * * *